US008415859B2

(12) United States Patent
Lee

(10) Patent No.: US 8,415,859 B2
(45) Date of Patent: Apr. 9, 2013

(54) PIEZOELECTRIC NANODEVICES

(75) Inventor: Kwangyeol Lee, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 290 days.

(21) Appl. No.: 12/606,824

(22) Filed: Oct. 27, 2009

(65) Prior Publication Data

US 2011/0095653 A1 Apr. 28, 2011

(51) Int. Cl.
*H02N 2/18* (2006.01)

(52) U.S. Cl. ......... 310/339; 290/1 R; 977/725; 977/732; 310/338

(58) Field of Classification Search ................... 310/339; 977/837, 762, 725, 732
See application file for complete search history.

(56) References Cited

U.S. PATENT DOCUMENTS

| | | | |
|---|---|---|---|
| 2008/0067618 A1* | 3/2008 | Wang et al. | 257/415 |
| 2008/0100182 A1* | 5/2008 | Chang et al. | 310/339 |
| 2009/0121709 A1* | 5/2009 | Gazit et al. | 324/207.13 |
| 2009/0179523 A1* | 7/2009 | Wang et al. | 310/338 |
| 2009/0309456 A1* | 12/2009 | Stollberg | 310/319 |

OTHER PUBLICATIONS

Yong Qin et. al, "Microfibre-nanowire hybrid structure for energy scavenging", Nature, vol. 451, Feb. 14, 2008, pp. 809-814.
Wang, Z.L.—"Towards Self-Powered Nanosystems : From Nanogenerators to Nanopiezotronics" Advanced Functional Materials, 2008, vol. 18, pp. 3553-3567, published online Nov. 4, 2008.
International Search Report and Written Opinion from International Application No. PCT/KR2010/007036 dated Jan. 11, 2011.
Wang Z.L. and Song, J., "Piezoelectric Nanogenerators Based on Zinc Oxide Nanowire Arrays," Science, vol. 312(5771), pp. 242-246, Apr. 14, 2006.

* cited by examiner

*Primary Examiner* — J. San Martin
*Assistant Examiner* — Bryan Gordon
(74) *Attorney, Agent, or Firm* — Workman Nydegger

(57) ABSTRACT

A piezoelectric nanodevice may include a first substrate having formed thereon a multiple number of nanorods and a second substrate having formed thereon a multiple number of piezoelectric nanorods. The first substrate associates with the second substrate to generate friction between the nanorods of the first substrate and the piezoelectric nanorods of the second substrate.

23 Claims, 14 Drawing Sheets

PIEZOELECTRIC NANODEVICES

BACKGROUND

Piezoelectric devices have received recent interest as an environmental power source that harvests electrical energy from environmental sources such as wind, waves, solar energy or body movements. Piezoelectric devices incorporate materials (such as crystals and certain ceramics) that have the ability to generate an electric potential in response to an applied mechanical stress. Recent developments in nanotechnology including nano-materials and nanodevices have led to interest in developing piezoelectric nanodevices capable of generating electricity.

SUMMARY

Piezoelectric nanodevices are provided. In one illustrative embodiment, a piezoelectric nanodevice includes a first substrate having formed thereon a multiple number of nanorods, and a second substrate having formed thereon a multiple number of piezoelectric nanorods. The first substrate associates with the second substrate to generate friction between the nanorods of the first substrate and the piezoelectric nanorods of the second substrate.

In another embodiment, a piezoelectric nanodevice includes a first plate having vertically affixed thereon a multiple number of first substrates each having nanorods, and a second plate having vertically affixed thereon a multiple number of second substrates each having piezoelectric nanorods. One of the first plate and the second plate functions as a movable plate which can be moved up down with respect to the other, and thus friction can be generated between the nanorods of the first substrates and the piezoelectric nanorods of the second substrates.

In still another embodiment, a piezoelectric nanodevice includes a first plate having vertically affixed thereon a multiple number of first substrates each having nanorods, a second plate having vertically affixed thereon a multiple number of second substrates each having piezoelectric nanorods and at least one connecting member whose one end is connected with one of the first plate and the second plate. The at least one connecting member can be lengthened or shortened to generate friction between the nanorods of the first substrates and the piezoelectric nanorods of the second substrates.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
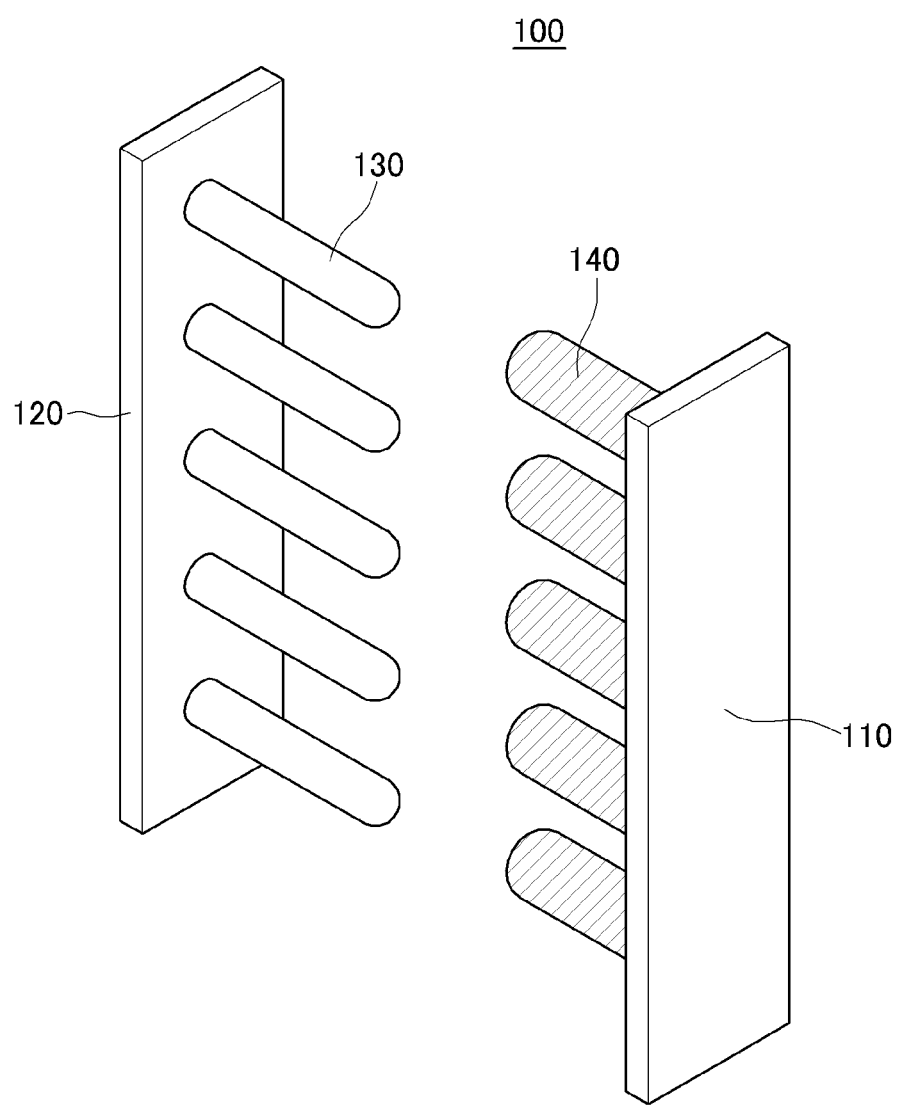
FIG. 1A is a schematic diagram showing an illustrative embodiment of first and second substrates of a piezoelectric nanodevice.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In one embodiment, a piezoelectric nanodevice includes a first substrate having formed thereon a multiple number of nanorods and a second substrate having formed thereon a multiple number of piezoelectric nanorods. The first substrate associates with the second substrate to generate friction between the nanorods of the first substrate and the piezoelectric nanorods of the second substrate.

FIG. 1A is a schematic diagram showing an illustrative embodiment of first and second substrates of a piezoelectric nanodevice. A piezoelectric nanodevice 100 includes a first substrate 110 having nanorods 140 and a second substrate 120 having piezoelectric nanorods 130. In one embodiment, first substrate 100 and second substrate 120 may include a material such as, but not limited to, glass, silicon, plastic, gallium arsenide or metal carbide, or any material having sufficient mechanical strength or hardness.

A multiple number of piezoelectric nanorods 130 may be formed or grown on second substrate 120. Piezoelectric nanorods 130 may include a piezoelectric material such as, but not limited to, zinc oxide (ZnO), cadmium sulfide (CdS), tin oxide ($SnO_2$), tourmaline, rochell salt, barium titanate ($BaTiO_3$), or monoammonium phosphate ($NH_4H_2PO_4$), or any material which can be grown in the shape of nanowire arrays and has a piezoelectric property.

Each of piezoelectric nanorods 130 may have a cross-sectional shape such as, by way of example, a circle, a rectangle, a hexagon and a polygon with a diameter from about 50 nm to about 200 nm, such as about 50 nm, about 100 nm, about 150 nm, or about 200 nm, and a length from about 200 nm to about 3,500 nm, such as about 500 nm, about 1,000 nm, about 1,500 nm, about 2,000 nm, about 2,500 nm, about 3,000 nm, or about 3,500 nm. However, the cross-sectional shape, diameter or length of piezoelectric nanorods 130 may be varied depending on the piezoelectric material, a manufacturing process or an electric power to be generated by piezoelectric nanodevice 100.

Further, a space between piezoelectric nanorods 130 may be of a few hundred nanometers, such as about 100 nm, about 200 nm, about 300 nm, about 400 nm, about 500 nm, about 600 nm, about 700 nm, about 800 nm, or about 900 nm, which is large enough for piezoelectric nanorods 130 to be bent to generate piezoelectric potential.

Piezoelectric nanorods 130 can be grown on second substrate 120 using any of a variety of well-known deposition processes, such as thermal vapor deposition, or physical vapor deposition. Hereinafter, one illustrative example for forming piezoelectric nanorods 130 on second substrate 120 will be explained. A seed layer (not shown) having a thickness of about 100 nm is uniformly coated on second substrate 120 by magnetron sputtering. Second substrate 120 is then submerged in a reactant solution of about 80° C. for about 12 hours. The reactant solution can be prepared by dissolving about 0.1878 g of $Zn(NO_3)_2.6H_2O$ and about 0.0881 g of hexamethylenetetramine in about 250 ml of deionized water at a room temperature. After about 12 hours, piezoelectric nanorods 130 are densely formed on second substrate 120. Second substrate 120 is then rinsed with deionized water several times, and baked at a temperature of about 150° C. for about 1 hour. Accordingly, piezoelectric nanorods 130 can be hydrothermally grown on a surface of second substrate 120, as depicted in FIG. 1A.

A multiple number of nanorods 140 can be grown or formed on first substrate 110. Nanorods 140 can be formed using any of the aforementioned deposition processes. Nanorods 140 may include a material such as, but not limited to, silicon (Si), zinc oxide (ZnO) or tin oxide ($SnO_2$), or any material which can be grown in the shape of nanowire arrays.

Each nanorod 140 may be coated with an electro conductive material. The electro conductive material can be selected from, but not limited to, Au, Pt, Ag, Cu or a combination thereof. Since nanorods 140 are coated with such a conductive material, nanorods 140 may not be readily or easily bent as compared to piezoelectric nanorods 130.

Figure 1B:
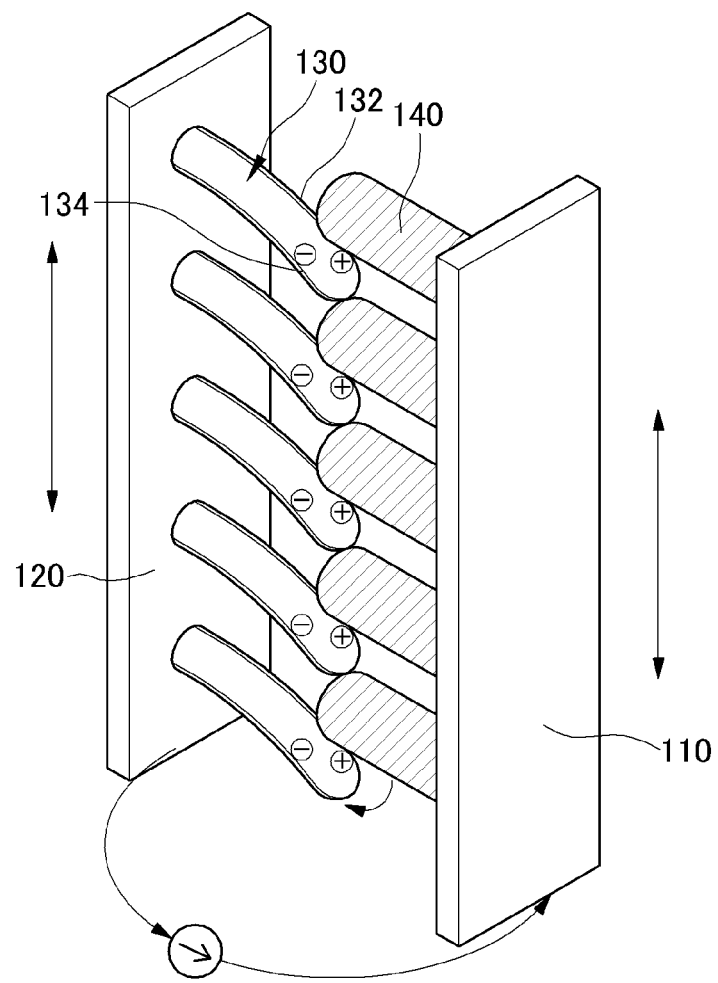
FIG. 1B is a schematic diagram for illustrating the association between the first and second substrates of FIG. 1A.

FIG. 1B is a schematic diagram for illustrating the association between the first and second substrates of FIG. 1A. First substrate 110 can be associated with second substrate 120 such that friction is generated between nanorods 140 of first substrate 110 and piezoelectric nanorods 130 of second substrate 120. As used herein, the term "association" generally refers to first substrate 110 being positioned adjacent to second substrate 120 in close enough proximity for nanorods 140 of first substrate 110 to be inserted into spaces between piezoelectric nanorods 130 of second substrate 120. In some embodiments, as depicted in FIG. 1B, first substrate 110 can be configured to slide up and down along second substrate 120 in a longitudinal direction thereof. Particularly, either or both first substrate 110 or second substrate 120 can be pushed or pulled upward or downward (as depicted by the arrow in FIG. 1B) in response to various external forces such as, but not limited to, thermal expansion and contraction, sound wave, mechanical vibration, air flow, muscle stretching or heartbeats. For example, the movement of either or both first substrate 110 or second substrate 120 in the upward or downward direction can cause first substrate 110 to be slid up and down with respect to second substrate 120. Accordingly, friction can be generated between nanorods 140 of first substrate 110 and piezoelectric nanorods 130 of second substrate 120.

Such mechanical stress generates electricity in piezoelectric nanorods 130 as a result of a piezoelectric effect. Piezoelectric nanorods 130 generate an electric voltage when a mechanical stress is applied thereto (for example, piezoelectric nanorods 130 are bent or stretched). This phenomenon occurs in crystals of piezoelectric nanorods 130 that have no center of symmetry. Each molecule of the crystals of piezoelectric nanorods 130 has a polarization, so that one end of each molecule is more negatively charged and the other end thereof is positively charged. This polarization is also referred to as a dipole moment. Accordingly, when a mechanical stress is applied to piezoelectric nanorods 130, the mechanical stress changes the arrangement of the dipole moments in piezoelectric nanorods 130 and generates an electric voltage.

Although FIG. 1A illustrates that first substrate 110 and second substrate 120 are configured to face each other, it is apparent to those skilled in the art that first and second substrates 110 and 120 can be differently configured to generate friction between first and second substrates 110 and 120. For example, first substrate 110 can be configured to position under second substrate 120 or first substrate 110 can be configured to position above second substrate 120.

Referring again to FIG. 1B, when first substrate 110 is moved in the downward direction, nanorods 140 give a pressure onto piezoelectric nanorods 130 so that piezoelectric nanorods 130 are bent in the downward direction. It is because nanorods 140, which are coated with an electro conductive material, have a hardness greater than that of piezoelectric nanorods 130. Accordingly, piezoelectric nanorods 130 can be bent by coated nanorods 140 when first substrate 110 or second substrate 120 is pushed or pulled in response to any of the above described external forces applied to first substrate 110 or second substrate 120, so that piezoelectric potential is generated in piezoelectric nanorods 130 due to its piezoelectric property. In detail, a stretched surface 132 (i.e., an upper surface 132 in FIG. 1B) of each piezoelectric nanorod 130 is charged with positive (+) potential and a compressed surface 134 (i.e., a lower surface 134 in FIG. 1B) of piezoelectric nanorod 130 is charged with negative (−) potential. The positively charged side (i.e. stretched surface 132 in FIG. 1B) has a reverse-biased Schottky contact with nanorods 140 whereas the negatively charged side (i.e. compressed surface 134 in FIG. 1B) has a forward-biased Schottky contact with nanorods 140. Thus, an electric current flows from coated nanorods 140 to piezoelectric nanorods 130.

Figure 2A:
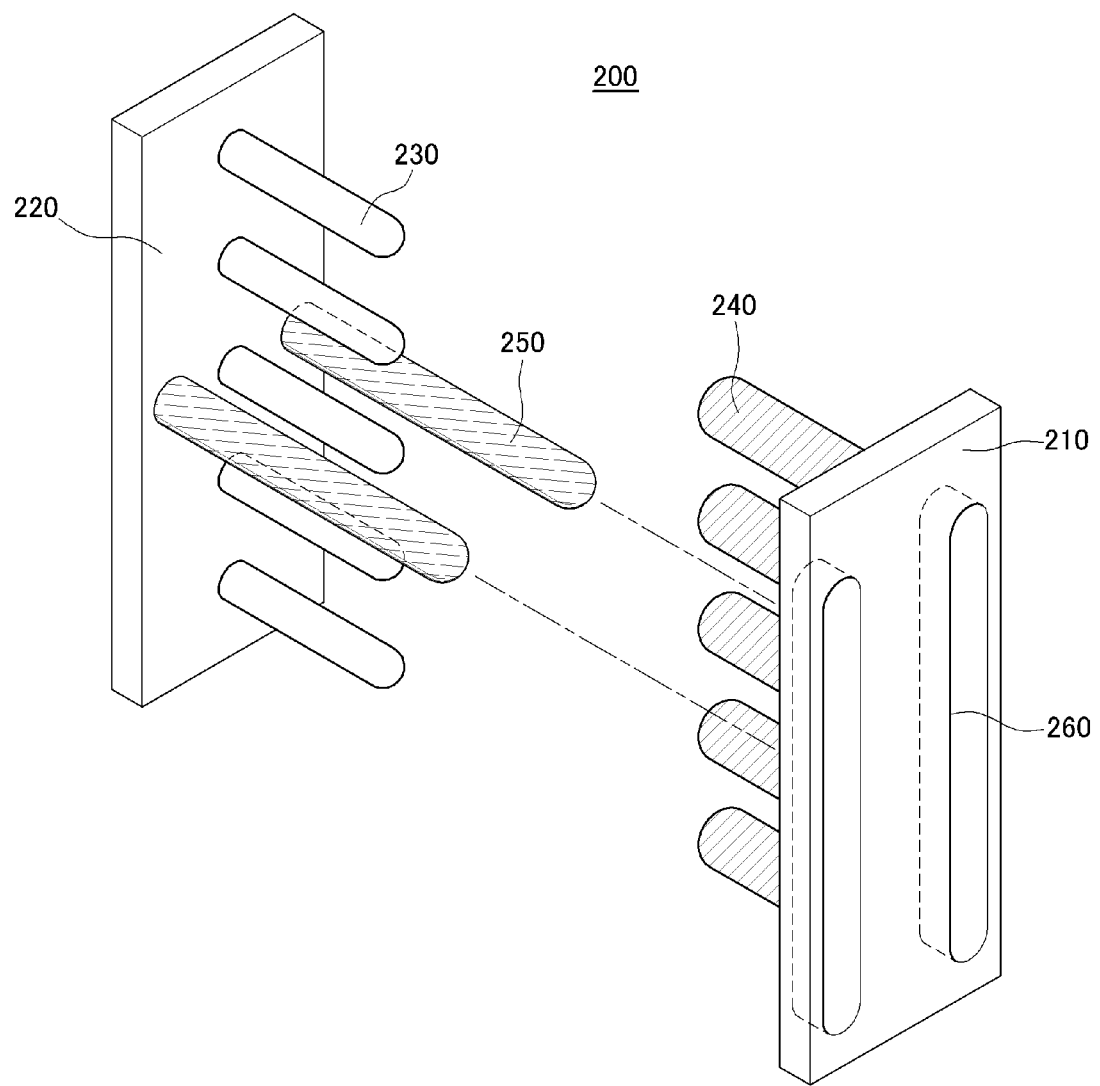
FIG. 2A is a schematic diagram showing another illustrative embodiment of first and second substrates of a piezoelectric nanodevice.

FIG. 2A is a schematic diagram showing another illustrative embodiment of first and second substrates of a piezoelectric nanodevice. A piezoelectric nanodevice 200 includes a first substrate 210 having a multiple number of nanorods 240 and one or more grooves 260, and a second substrate 220 having a multiple number of piezoelectric nanorods 230 and one or more protrusions 250. Since materials and fabricating processes used for forming piezoelectric nanorods 230 and nanorods 240 are similar or substantially identical to those of piezoelectric nanorods 130 and nanorods 140 discussed above in conjunction with FIG. 1A, redundant description thereof will be omitted herein.

In some embodiments, one or more, for example, two grooves 260 can be formed on both ends of first substrate 210, respectively, and one or more, for example, two protrusions 250 can be formed on both ends of second substrate 220, respectively, such that two protrusions 250 can be inserted into two grooves 260 respectively. Two grooves 260 have a longer length than that of two protrusions 250 such that two protrusions 250 can be moved within two grooves 260, respectively, as described below. Although the lower end of each groove 260 and the upper end of each protrusion 250 are illustrated to have a round shape in FIG. 2A, they may have, for example, a polygonal shape or a sector shape. The shape and the number of grooves 260 and protrusions 250 may be modified in various ways in order to prevent from a separation of protrusions 250 once inserted in grooves 260 can be suppressed.

Figure 2B:
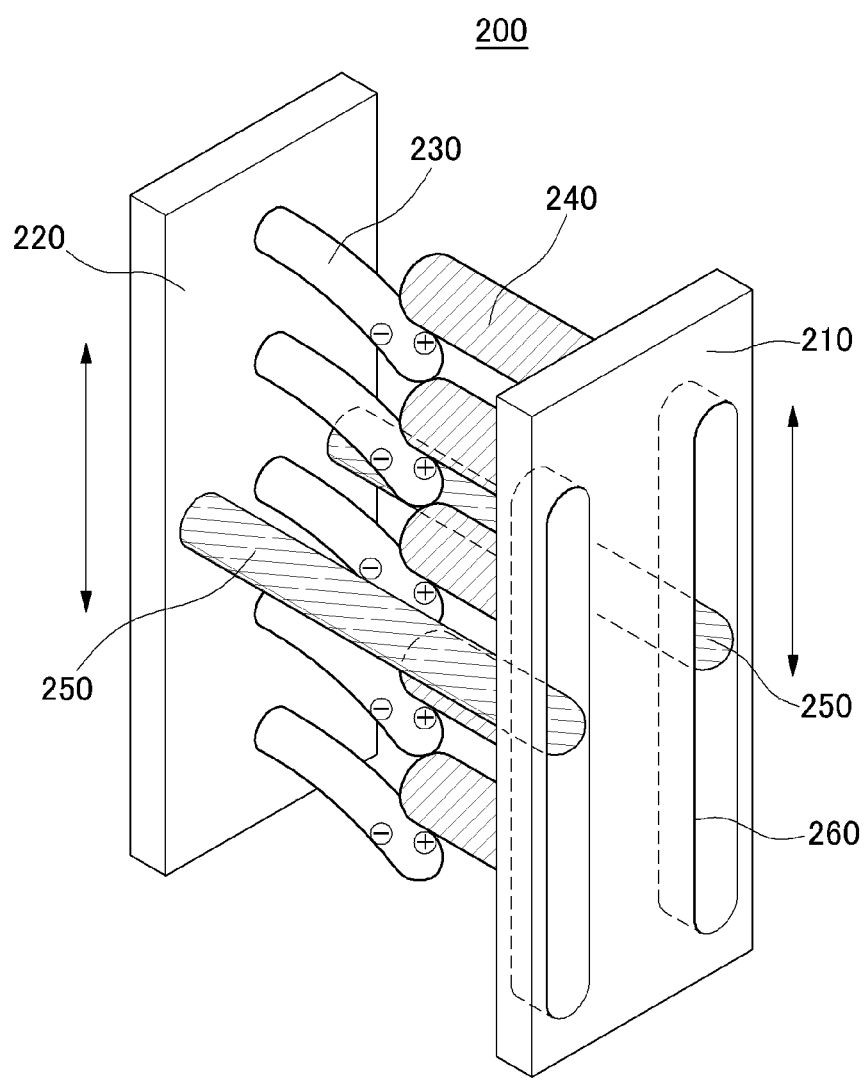
FIG. 2B is a schematic diagram for illustrating the association between the first and second substrates of the piezoelectric nanodevice of FIG. 2A.
Figure 2C:
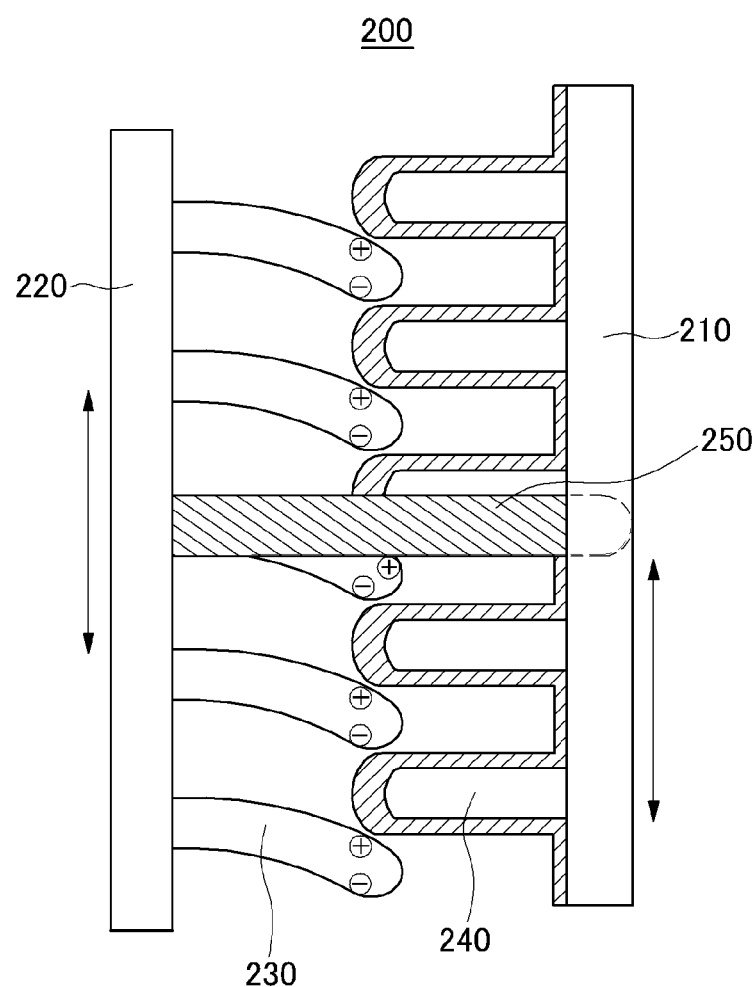
FIG. 2C is a front view of the piezoelectric nanodevice of FIG. 2B.

FIG. 2B is a schematic diagram for illustrating the association between the first and second substrates of the piezoelectric nanodevice of FIG. 2A. FIG. 2C is a front view of the piezoelectric nanodevice of FIG. 2B. Referring to FIG. 2B and FIG. 2C, once protrusions 250 are inserted into grooves 260, protrusions 250 can be moved up and down in grooves 260 (as depicted by the arrow in FIGS. 2B and 2C) without being separated from grooves 260 in response to the above described external forces applied to first or second substrate 210 or 220. First substrate 210 is vibrated in up and down directions with respect to second substrate 220 and thus nanorods 240 of first substrate 210 may give a pressure onto piezoelectric nanorods 230 of second substrate 220. Accordingly, piezoelectric nanorods 230 of second substrate 220 can be bent by nanorods 240 of first substrate 210.

Although FIGS. 2A to 2C illustrate that first substrate 210 is provided with grooves 260 and second substrate 220 is provided with protrusions 250, it will be apparent to those skilled in the art that first substrate 210 and second substrate 220 can be provided with protrusions 250 and grooves 260, respectively.

Further, the number of protrusions 250 and the number of grooves 260 are not limited to two. For example, there can be provided one protrusion 250 and one groove 260 or more than two protrusions 250 and grooves 260.

Figure 2D:
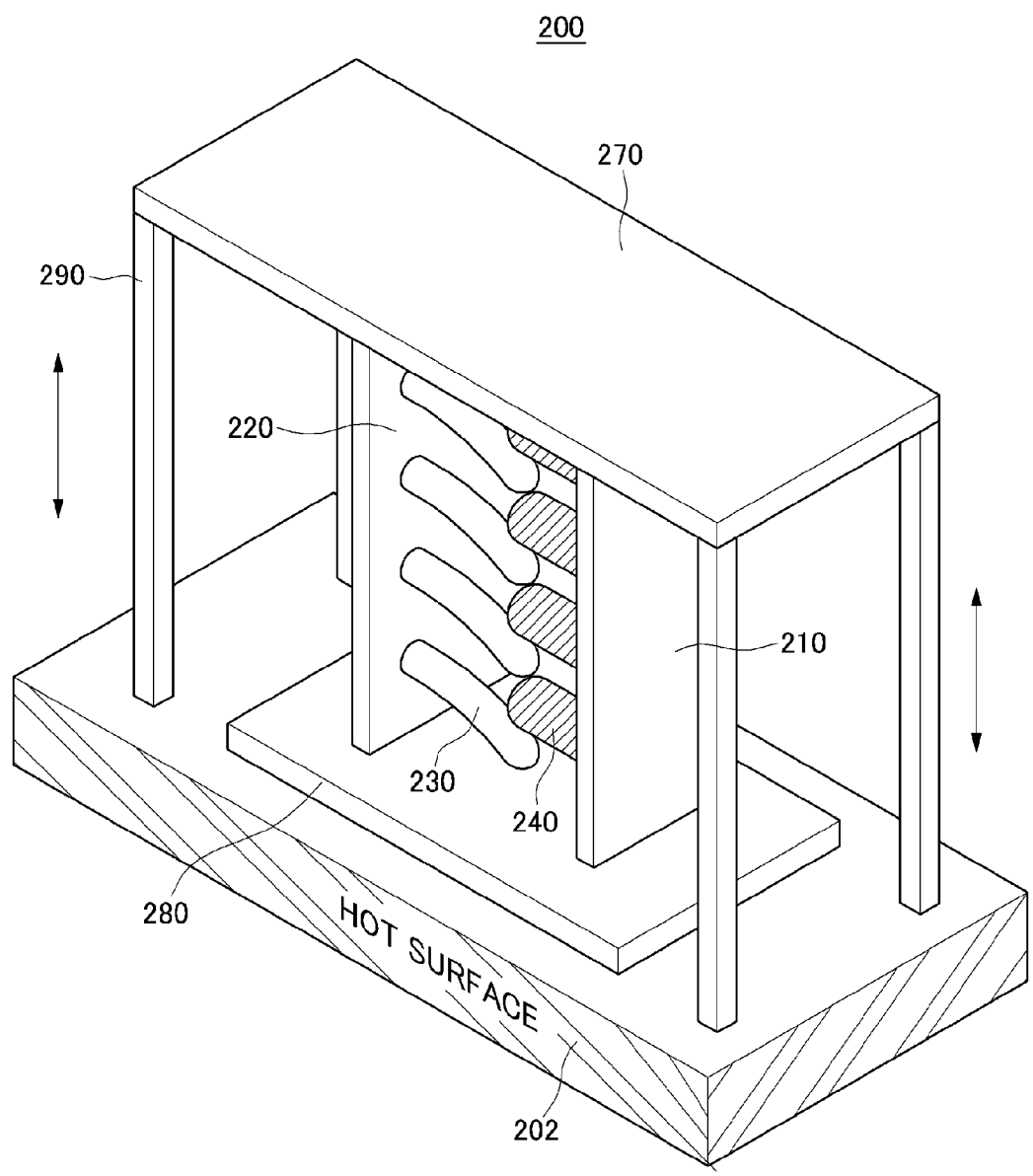
FIG. 2D is a schematic diagram of an illustrative embodiment of the piezoelectric nanodevice including the first and second substrates of FIG. 2A.
Figure 2E:
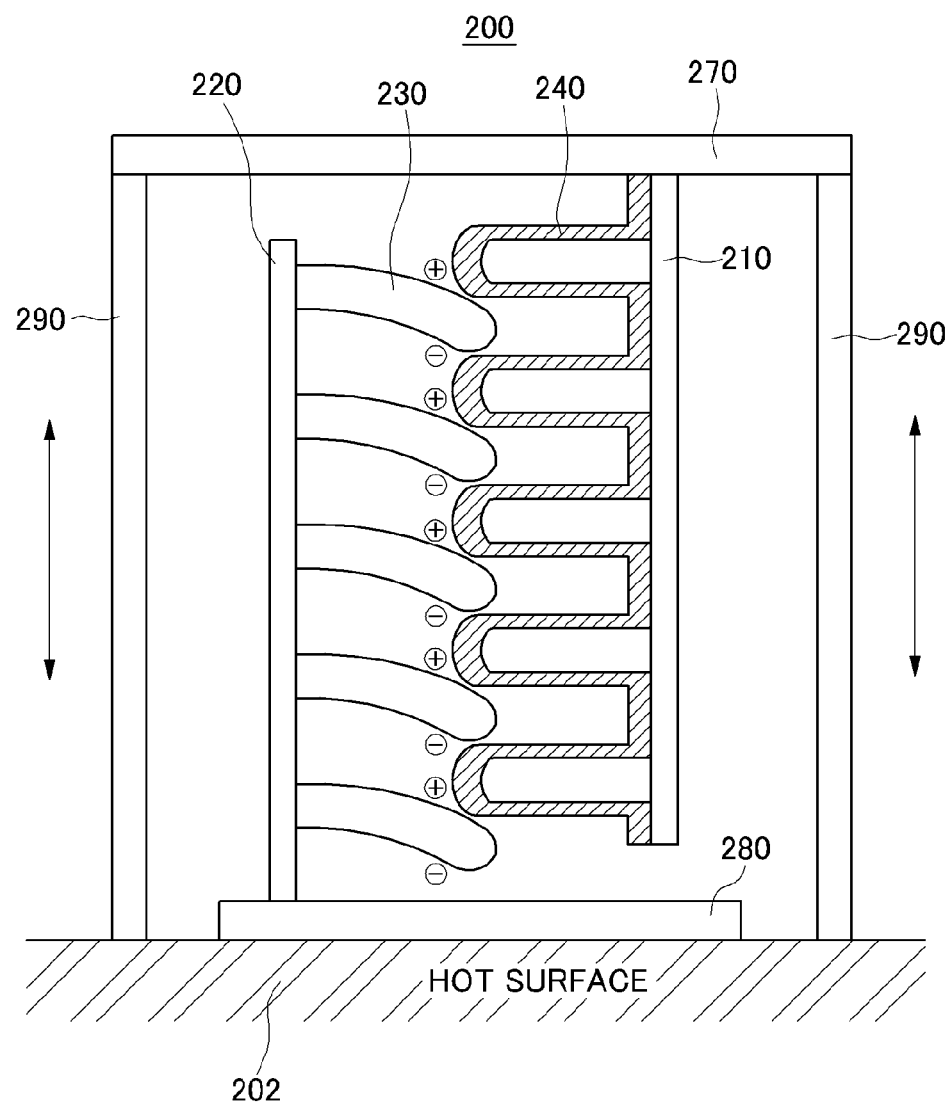
FIG. 2E is a front view of the piezoelectric nanodevice of FIG. 2D.

FIG. 2D is a schematic diagram of an illustrative embodiment of piezoelectric nanodevice 200 including first and second substrates 210 and 220 of FIG. 2A. FIG. 2E is a front view of the piezoelectric nanodevice of FIG. 2D. Referring to FIG. 2D and FIG. 2E, piezoelectric nanodevice 200 may optionally include a first plate 270 serving as a movable plate, a second plate 280 serving as a fixed plate and two or more connecting members 290 (although four connecting members 290 are depicted in FIG. 2D) in addition to first substrate 210 and second substrate 220.

First plate 270 and second plate 280 may include a material such as, but not limited to, glass, plastic or metal carbide, or any material having sufficient mechanical strength or hardness in a hot or cold environment.

First substrate 210 may be installed vertically on first plate (movable plate) 270 by any affixing methods, such as a welding, or adhesion using silicone, epoxy or urethane such that nanorods 240 are horizontally located on first plate 270. Second substrate 220 may be installed vertically on second plate (fixed plate) 280 by any of the aforementioned methods such that piezoelectric nanorods 230 are horizontally located on second plate 280. Accordingly, nanorods 240 of first substrate 210 can face piezoelectric nanorods 230 of second substrate 220 to generate frictions between piezoelectric nanorods 230 and nanorods 240. Fixed plate 280 can be installed on a hot surface 202 which can be heated by any heating sources, such as an electronic device, a mechanical engine, or the sun and can transfer heat to fixed plate 280. By way of example, a hot building surface, a hot power plant surface, a thermal engine surface, or an asphalt road can be used for hot surface 202. One end of each connecting member 290 may be connected with movable plate 270 and the other end of each connecting member 290 may be affixed to hot surface 202 directly.

By way of example, connecting members 290 may be pillars, columns, or other suitable supporting members that support first plate 270. Connecting members 290 may include a material having a high thermal expansion coefficient such as, but not limited to, titanium, stainless steel, copper, aluminum or silver. For example, connecting members 290 can be heated with the heat transferred from hot surface 202. Further, connecting members 290 can be cooled using any of a variety of well-known coolers, such as a water-cooling device or an air-cooling device. A cooler (not shown) can be provided to connecting members 290 to cool them periodically or intermittently. By way of example, if the cooler is a pipe or tube surrounding or penetrating connecting members 290, water or coolant can be intermittently flown therein to cool connecting members 290.

If heat is transferred to connecting members 290 from hot surface 202, connecting members 290 can be heated and thus expanded. As connecting members 290 are expanded, both movable plate 270 and first substrate 210 vertically installed on movable plate 270 are upwardly moved. In contrast, if the coolant is input to connecting members 290 through the pipe or tube, connecting members 290 can be cooled and thus contracted. As connecting members 290 are contracted, both movable plate 270 and first substrate 210 affixed to movable plate 270 are downwardly moved. Although heat is also transferred to fixed plate 280 from hot surface 202, fixed plate 280 is composed of a material having a low heat transfer coefficient such as, but not limited to, glass, plastic or metal carbide, and, thus, fixed plate 280 is not likely to transfer the heat transferred from hot surface 202 to second substrate 220. Similarly, although heat is also transferred to movable plate 270 from connecting members 290, movable plate 270 is also composed of a material having a low heat transfer coefficient, and, thus, movable plate 270 is not likely to transfer the heat transferred from connecting members 290 to first substrate 210. Therefore, movable plate 270, fixed plate 280, first substrate 210 and second substrate 220 are hardly affected by the heat transferred from hot surface 202.

Accordingly, as movable plate 270 and first substrate 210 are upwardly moved by heating and downwardly lowered by cooling, first substrate 210 is vibrated up and down (as depicted by the arrow in FIG. 2D and FIG. 2E) due to the force caused by the movement. This vibration of first substrate 210 can make nanorods 240 of first substrate 210 to slide up and down with respect to piezoelectric nanorods 230 of second substrate 220 to make piezoelectric nanorods 230 of second substrate 220 to be bent. Accordingly, friction can be generated between nanorods 240 and piezoelectric nanorods 230, and thus an electric current can flow from nanorods 240 to piezoelectric nanorods 230. By repeating heating and cooling connecting members 290 as described above, the expansion and contraction of connecting members 290 are repeated, and, thus, first substrate 210 fastened to movable plate 270 can be vibrated up and down. As a result, friction can be generated between nanorods 240 on first substrate 210 and piezoelectric nanorods 230 on second substrate 220, and, thus, electricity can be generated.

Although not illustrated in FIG. 2D and FIG. 2E for the convenience of illustration, first substrate 210 and second substrate 220 may be provided with at least one groove 260 or protrusion 250 shown in FIGS. 2A to 2C, respectively, to allow first substrate 210 to be securely slid against second substrate 220. However, protrusions 250 and grooves 260 are optional and may be omitted in certain embodiments.

Further, it will be also apparent to those skilled in the art that first substrate 210 and second substrate 220 can be affixed to fixed plate 280 and movable plate 270, respectively, in the reverse way as that shown in FIG. 2D and FIG. 2E. Furthermore, though four connecting members 290 are shown in FIG. 2D, the number of connecting members 290 is not limited to four, and any number of connecting members 290 that can move movable plate 270 up and down can be employed. Furthermore, although each of four connecting members 290 is shown to have a rectangular cross sectional shape in FIG. 2D, the cross sectional shape of connecting members 290 is not limited to a rectangle, and any shape of connecting members 290 can be employed.

Figure 3A:
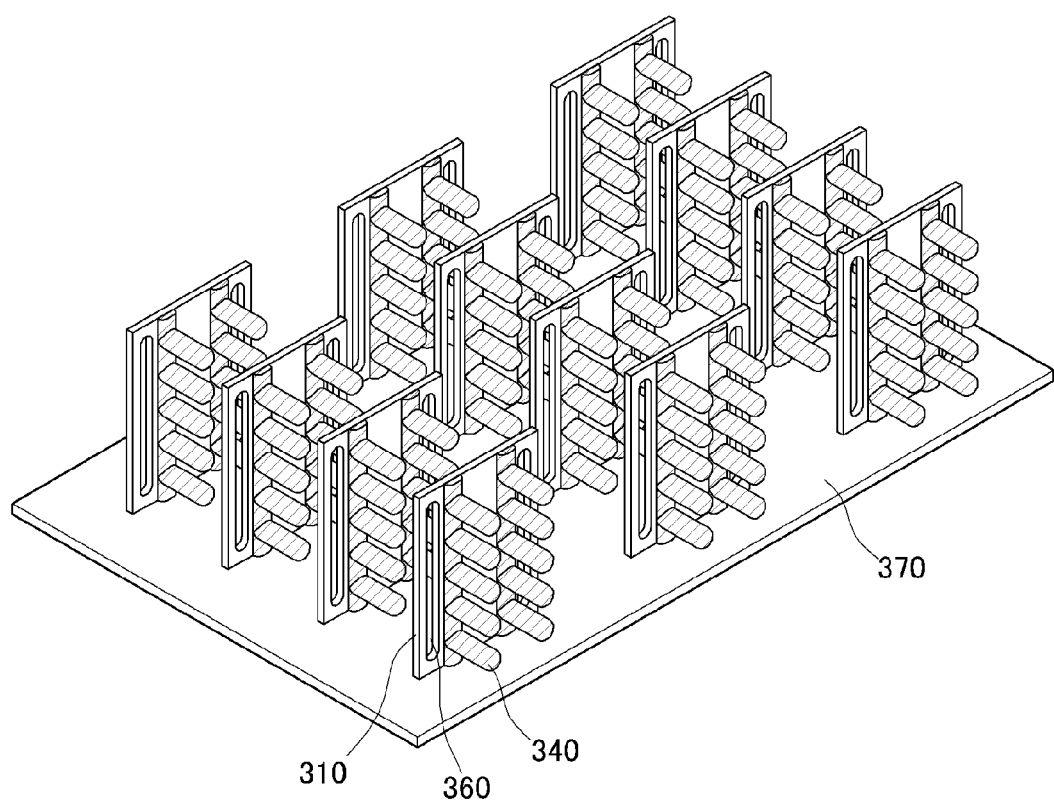
FIG. 3A shows an illustrative embodiment of a first plate having a multiple number of first substrates.
Figure 3B:
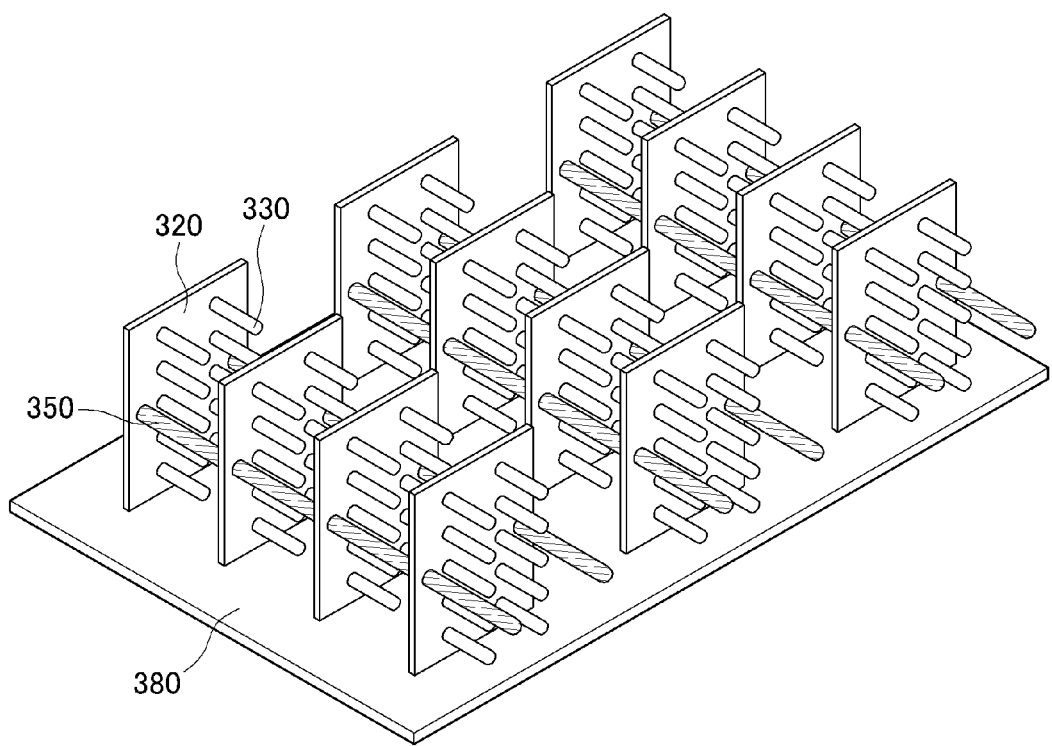
FIG. 3B shows an illustrative embodiment of a second plate having a multiple number of second substrates.
Figure 3C:
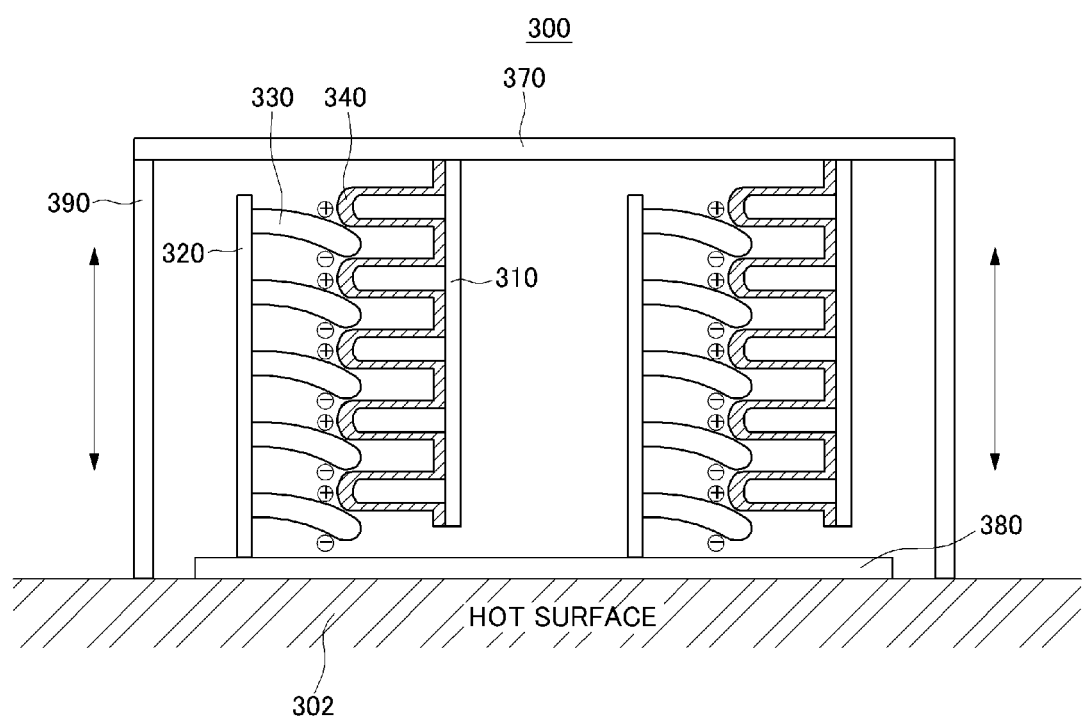
FIG. 3C is a schematic diagram of an illustrative embodiment of a piezoelectric nanodevice including the first plate and the second plate of FIG. 3A and FIG. 3B.

FIG. 3A shows an illustrative embodiment of a first plate 370 having a multiple number of first substrates 310, FIG. 3B shows an illustrative embodiment of a second plate 380 having a multiple number of second substrates 320 and FIG. 3C is a schematic diagram of an illustrative embodiment of a piezoelectric nanodevice 300 including first plate 370 and second plate 380 of FIG. 3A and FIG. 3B.

As compared to piezoelectric nanodevice 200 in FIG. 2D and FIG. 2E, first plate (functioning as a movable plate) 370 has a multiple number of first substrates 310 each having nanorods 340, and second plate (functioning as a fixed plate) 380 has a multiple number of second substrates 320 each having piezoelectric nanorods 330.

Since each of first substrates 310, each of second substrates 320, piezoelectric nanorods 330, nanorods 340, at least one protrusion 350, at least one groove 360, first plate 370, second plate 380 and connecting members 390 in FIG. 3A to FIG. 3C may be similar or substantially identical to first substrate 210, second substrate 220, piezoelectric nanorods 230, nanorods 240, at least one protrusion 250, at least one groove 260, first plate 270, second plate 280 and connecting members 290 in FIG. 2A to FIG. 2E, redundant description thereof will be omitted herein.

FIG. 3A and FIG. 3B illustrate that the multiple number of first substrates 310, each first substrate 310 having nanorods 340 and grooves 360, and the multiple number of second substrates 320, each second substrate 320 having piezoelectric nanorods 330 and protrusions 350, are provided on respective plates 370 and 380. As a result, a greater amount of friction can be generated between piezoelectric nanorods 330 and nanorods 340, and, thus, a larger quantity of electricity can be obtained with piezoelectric nanodevice 300.

Because it has multiple first and second substrates 310 and 320, piezoelectric nanodevice 300 can still generate electricity even if one or some of first or/and second substrate 310 and 320 has defect. Further, piezoelectric nanodevice 300 can still generate the electricity even if one or some of first or/and second substrate 310 and 320 is defected. By way of example, where a multiple number of first substrates 310 and second substrates 320 is independently installed on first plate 370 and second plate 380, first or second substrate 310 or 320 having defect nanorod 340 or piezoelectric nanorod 330 can be readily pulled out and replaced with new first or second substrate 310 or 320.

Although first substrate 310 is shown to have coated nanorods 340 and second substrate 320 is shown to have piezoelectric nanorods 330 in FIG. 3A and FIG. 3B, it is also possible that first substrate 310 may have piezoelectric nanorods 330 while second substrate 320 may have nanorods 340. Further, protrusion 350 and groove 360 are optional and may be omitted in certain embodiments.

For the simplicity of illustration, two connecting members 390, two first substrates 310 and two second substrates 320 are shown in FIG. 3C. For example, as depicted in FIG. 3C, an upper end of each connecting member 390 is connected with first plate 370, whereas a lower end of each connecting member 390 is directly installed to a hot surface 302, such as a hot building surface, a hot power plant surface, or a thermal engine surface. Connecting members 390 may include a material having a high thermal expansion coefficient. Thus, heat can be transferred from hot surface 302 to connecting members 390 so that connecting members 390 can be lengthened. Further, by cooling connecting members 390 intermittently by a cooler (not shown), connecting members 390 can be shortened. Although heat is also transferred to first substrates 310 and second substrates 320 via first plate 370 and second plate 380, the influence due to the heat can be minimized because first plate 370 and second plate 380 have a low heat transfer coefficient.

Since first plate 370 is affixed to two connecting members 390, if connecting members 390 are heated and thus expanded, first plate 370 and first substrate 310 would be upwardly moved. If connecting members 390 are cooled and thus contracted, first plate 370 and first substrate 310 would be lowered down, and, thus, the distance between first plate 370 and second plate 380 is shortened again.

Accordingly, by repeating heating and cooling connecting members 390, first plate 370 is moved upward and downward, thereby generating friction between piezoelectric nanorods 330 and nanorods 340. This movement of first plate 370 can make nanorods 340 of first substrate 310 to slide up and down with respect to piezoelectric nanorods 330 of second substrate 320, and, thus, to make piezoelectric nanorods 330 of second substrate 320 to be bent. Thus, piezoelectric potential is generated in piezoelectric nanorods 330 so that an electric current flows from nanorods 340 to piezoelectric nanorods 330.

Figure 4:
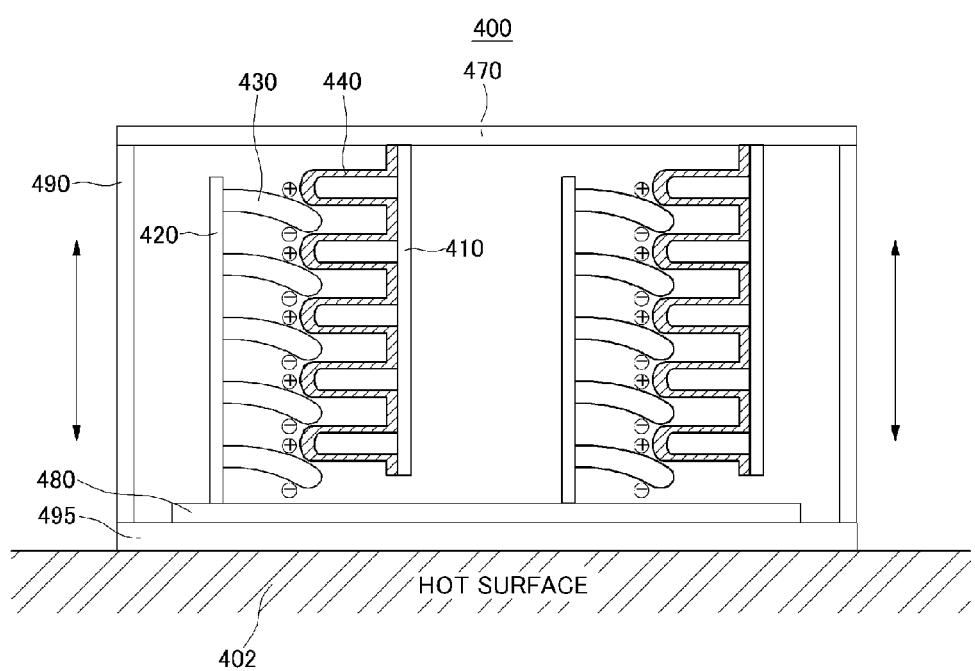
FIG. 4 is a schematic diagram of an illustrative embodiment of a piezoelectric nanodevice provided with a heat conducting plate.

FIG. 4 is a schematic diagram of an illustrative embodiment of a piezoelectric nanodevice 400 provided with a heat conducting plate. In FIG. 4, a reference numeral 410 represents first substrates, a reference numeral 420 represents second substrates, a reference numeral 430 represents piezoelectric nanorods, a reference numeral 440 represents nanorods, a reference numeral 470 represents a first plate, a reference numeral 480 represents a second plate, a reference numeral 490 represents connecting members and a reference numeral 495 represents a heat conducting plate. Since each of first substrates 410, each of second substrates 420, piezoelectric nanorods 430, nanorods 440, at least one protrusion (not shown), at least one groove (not shown), first plate 470, second plate 480 and connecting members 490 in FIG. 4 are similar or substantially identical to first substrate 310, second substrates 320, piezoelectric nanorods 330, nanorods 340, at least one protrusion 350 (see FIG. 3B), at least one groove 360 (see FIG. 3A), first plate 370 and second plate 380 and connecting members 390 in FIG. 3C, redundant description thereof will be omitted herein.

As compared to piezoelectric nanodevice 300 in FIG. 3C, a heat conducting plate 495 is additionally installed on a hot surface 402, such as a hot building surface, a hot power plant surface, or a thermal engine surface. In this embodiment, a lower end of each connecting member 490 is directly installed to heat conducting plate 495, instead of being installed to hot surface 402, and second plate 480 is also placed on heat conducting plate 495.

Heat conducting plate 495 may include a material having a high thermal conductivity such as, but not limited to, iron, stainless steel, tungsten, copper, aluminum or silver. Thus, heat can be readily transferred from hot surface 402 to connecting members 490. Since connecting members 490 have a high thermal expansion coefficient, they are lengthened by heat transferred from heat conducting plate 495 and shortened by cooling operation. Accordingly, by repeating heating and cooling connecting members 490, first plate 470 can be moved upward and downward while generating friction between piezoelectric nanorods 430 and nanorods 440. Thus, piezoelectric potential is generated in piezoelectric nanorods 430 and a current can be flown from nanorods 440 to piezoelectric nanorods 430.

Figure 5:
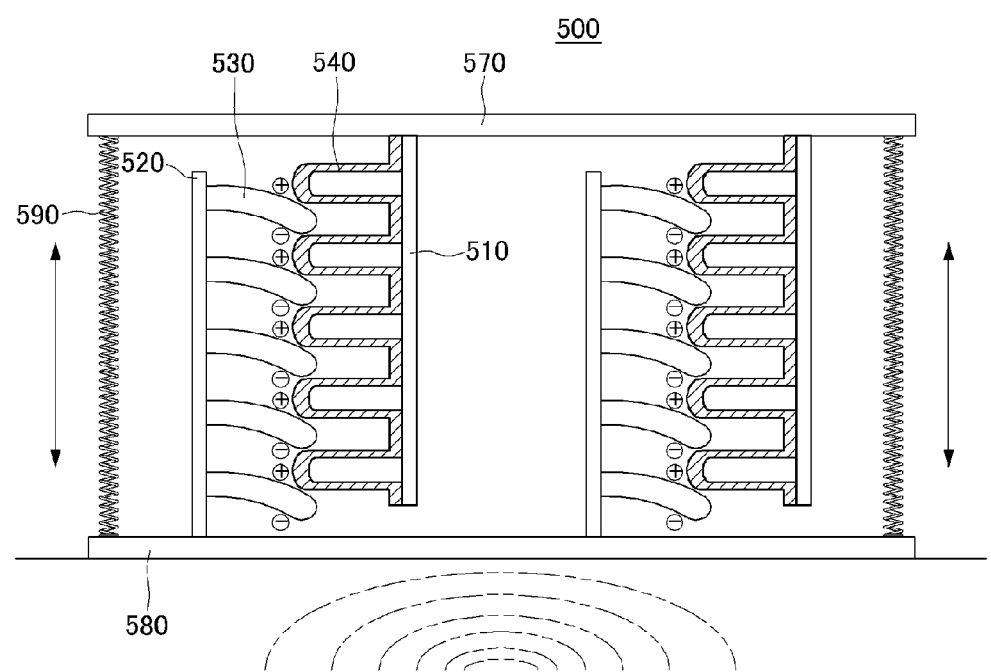
FIG. 5 is a schematic diagram of an illustrative embodiment of a piezoelectric nanodevice whose connecting members are made of an elastic material.

FIG. 5 is a schematic diagram of an illustrative embodiment of a piezoelectric nanodevice 500 whose connecting members are made of an elastic material such as, but not limited to, a spring or a rubber. In FIG. 5, a reference numeral 510 represents first substrates, a reference numeral 520 represents second substrates, a reference numeral 530 represents piezoelectric nanorods, a reference numeral 540 represents nanorods, a reference numeral 570 represents a first plate, a reference numeral 580 represents a second plate and a reference numeral 590 represents connecting members. Since each of first substrates 510, each of second substrates 520, piezoelectric nanorods 530, nanorods 540, at least one protrusion (not shown), at least one groove (not shown), first plate 570 and second plate 580 in FIG. 5 are substantially similar to first substrate 310, second substrates 320, piezoelectric nanorods 330, nanorods 340, at least one protrusion 350 (see FIG. 3B), at least one groove 360 (see FIG. 3A), first plate 370 and second plate 380 in FIG. 3C, redundant description thereof will be omitted herein.

As compared to piezoelectric nanodevice 300 in FIG. 3C, two connecting members 590 are made of an elastic material, instead of the material having a high thermal expansion coefficient. Although FIG. 5 illustrates that a lower end of each connecting member 590 is installed to second plate 580, the lower end of each connecting member 590 can also be installed directly to a vibrating surface as like the lower end of each connecting member 390 is directly installed to a hot surface 302 as depicted in FIG. 3C. Piezoelectric nanodevice 500 can be installed in an environment where vibrations are already existed, for example, near a speaker or a noisy road.

By way of example, connecting members 590 may be made of a spring or a rubber. Connecting members 590 can be stretched and compressed responsive to external forces, for example, mechanical vibrations, sound waves or air flows applied to at least one of first plate 570, second plate 580 and connecting members 590. If the vibrations, the sound waves or the air flows are applied to piezoelectric nanodevice 500, connecting members 590 can be readily vibrated up and down. Thus, first plate 570 to which first substrates 510 are affixed and second plate 580 to which second substrates 520 are affixed are vibrated up and down, and, thus, friction can be generated between nanorods 540 of first substrates 510 and piezoelectric nanorods 530 of second substrates 520. Accordingly, while nanorods 540 of first substrate 510 slide up and down with respect to piezoelectric nanorods 530 of second substrate 520, nanorods 540 of first substrate 510 make piezoelectric nanorods 530 of second substrate 520 to be bent. Therefore, an electric current can flow due to a piezoelectric effect.

Although any protrusion or groove is not shown in FIG. 3C to FIG. 5 for the simplicity of illustration, first substrate 310, 410 or 510 and second substrate 320, 420 or 520 may be provided with at least one protrusion or groove, respectively. However, the protrusion and the groove are optional and may be omitted.

Figure 6A:
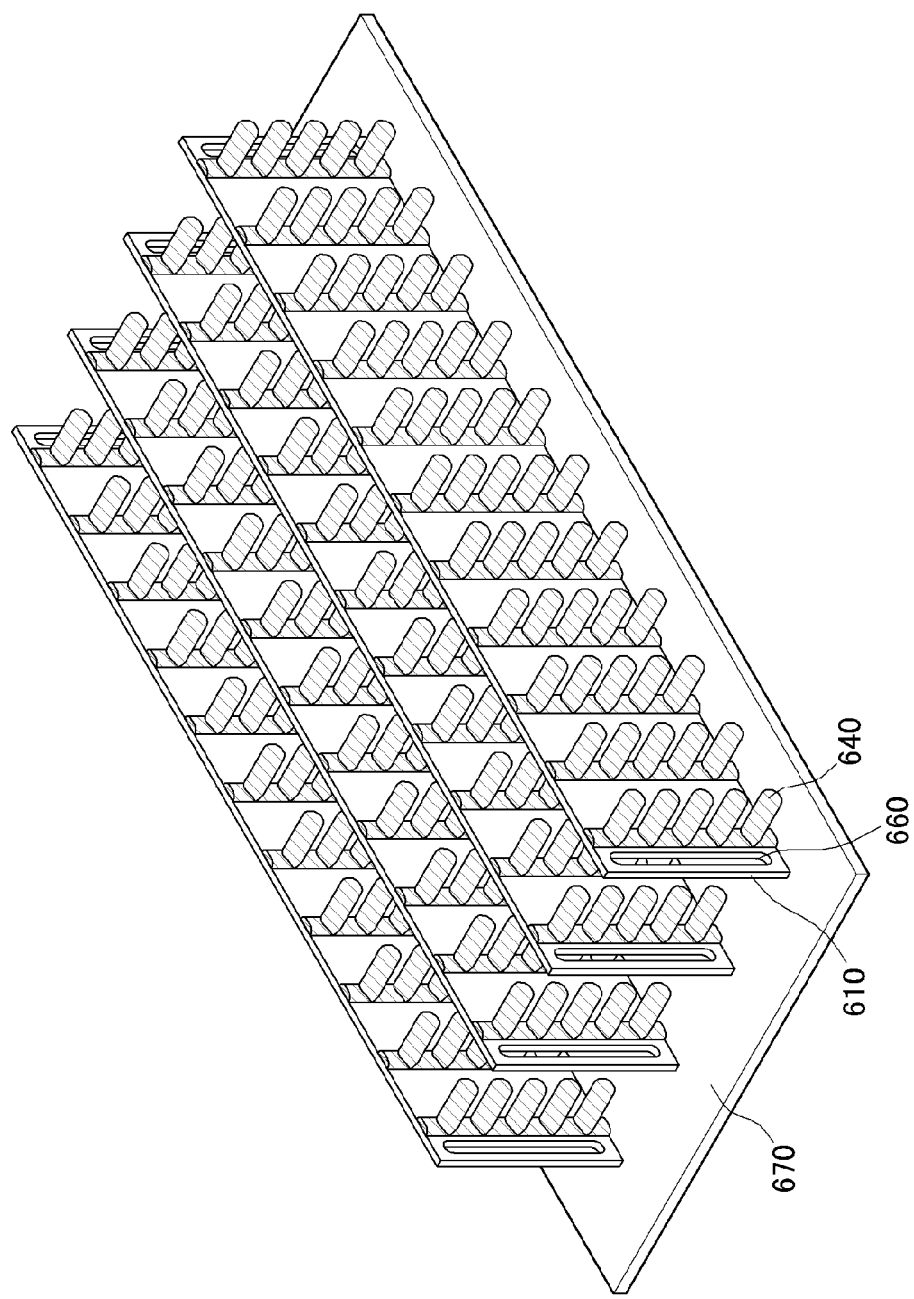
FIG. 6A shows an illustrative embodiment of a first plate having installed thereon enlarged first substrates.
Figure 6B:
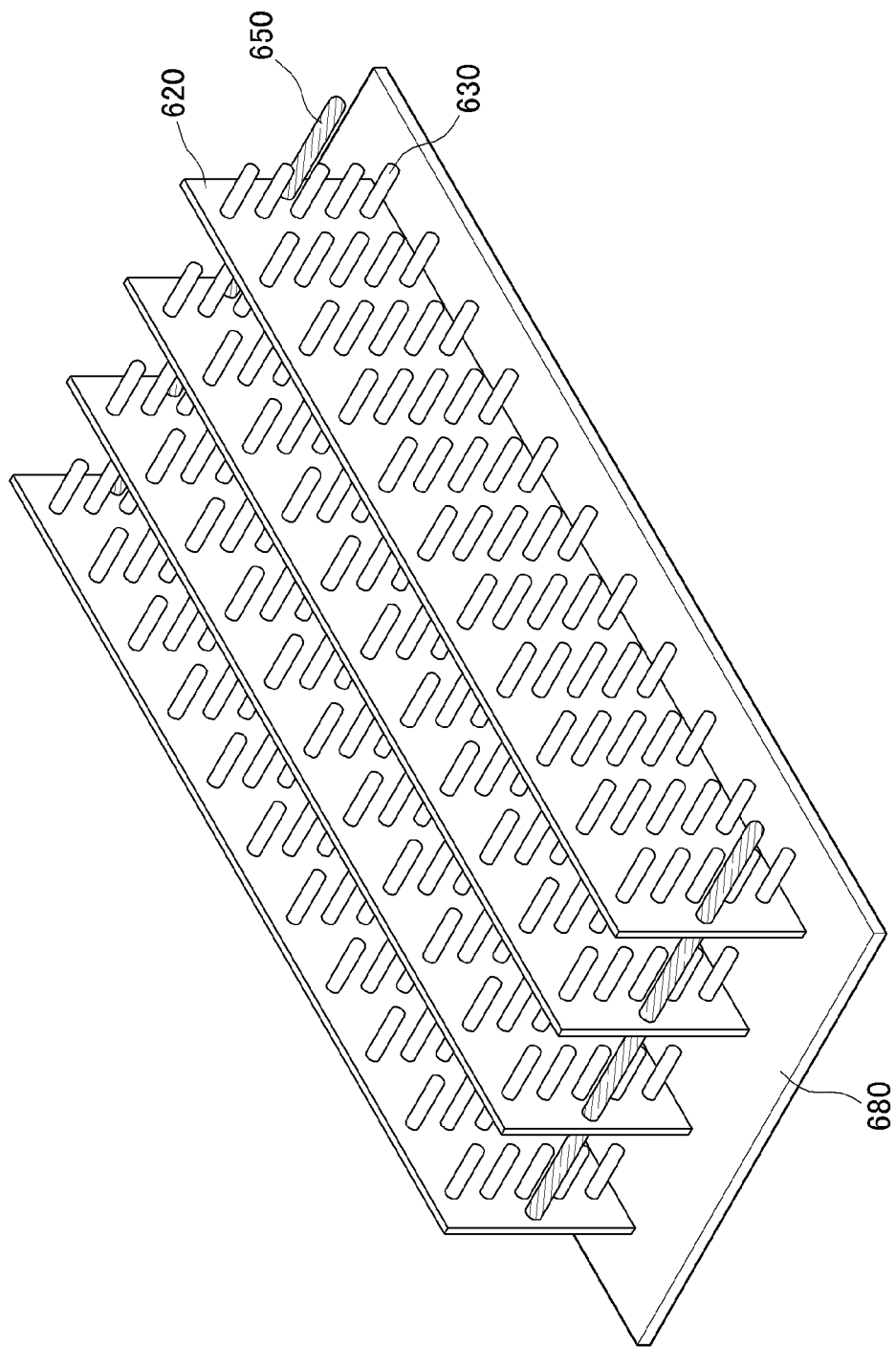
FIG. 6B shows an illustrative embodiment of a second plate having installed thereon enlarged second substrates.

FIG. 6A shows an illustrative embodiment of a first plate having installed thereon enlarged first substrates and FIG. 6B shows an illustrative embodiment of a second plate having installed thereon enlarged second substrates.

In FIG. 6A and FIG. 6B, a reference numeral 610 represents first substrates, a reference numeral 620 represents second substrates, a reference numeral 630 represents piezoelectric nanorods, a reference numeral 640 represents nanorods, a reference numeral 650 represents protrusions, a reference numeral 660 represents groove, a reference numeral 670 represents a first plate and a reference numeral 680 represents a second plate. Since piezoelectric nanorods 630, nanorods 640, each of protrusions 650 and each of grooves 660 in FIG. 6A and FIG. 6B are similar or substantially identical to piezoelectric nanorods 330, nanorods 340, each of protrusion 350 and each of groove 360 in FIG. 3A and FIG. 3B, redundant description thereof will be omitted herein.

As compared to first plate 370 and second plate 380 of FIG. 3A and FIG. 3B, first plate 670 and second plate 680 illustrated in FIG. 6A and FIG. 6B include a smaller number of first substrates 610 and second substrates 620 whereas the size or length of each of first substrates 610 and second substrates 620 is larger than that of each of first substrates 310 and second substrates 320 in FIG. 3A and FIG. 3B.

Hence, a piezoelectric nanodevice in accordance with this embodiment can be manufactured more readily while requiring a lower cost and smaller number of manufacturing processes. Further, because first substrates 610 and second substrates 620 have a large size, first substrates 610 and second substrates 620 may include a greater number of nanorods 640 and piezoelectric nanorods 630, respectively. Thus, the piezoelectric nanodevice can generate a greater quantity of electricity.

Although first substrate 610 is shown to have coated nanorods 640 and second substrate 620 is shown to have piezoelectric nanorods 630 in FIG. 6A and FIG. 6B, it is also possible that first substrate 610 may have piezoelectric nanorods 630 while second substrate 620 may have nanorods 640. Further, protrusions 650 and grooves 660 are optional and may be omitted in certain embodiments.

It will be apparent to those skilled in the art that piezoelectric nanodevices 300, 400 and 500 in FIG. 3C to FIG. 5 can include either of first plate 370 of FIG. 3A or 670 of FIG. 6A as a first plate and either of second plate 380 of FIG. 3B or second plate 580 of FIG. 6B as a second plate. Further, the shape of the plates of FIG. 3A to FIG. 6B can be modified without being limited to the examples illustrated in FIG. 3A to FIG. 6B.

Moreover, it will be also apparent to those skilled in the art that the above-described illustrative embodiments of the present disclosure can be also applied to any environment which can generate friction between the nanorods and the piezoelectric nanorods. Such environment may include a noisy space or a heated surface such as a hot building surface, a power plant surface and a thermal engine surface.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a second third, middle third and first third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A piezoelectric nanodevice comprising:
    a first planar substrate having formed thereon a multiple number of nanorods;
    a second planar substrate having formed thereon a multiple number of piezoelectric nanorods;
    a first plate associated with the first substrate; and
    a second plate associated with the second substrate,
    wherein the first plate is moveable in a plane relative to the second plate such that the first substrate associates with the second substrate to generate friction between the nanorods of the first substrate and the piezoelectric nanorods of the second substrate to generate electric voltage,
    wherein one of:
        the first plate is coupled to at least one connecting member and the at least one connecting member is expandable by heating and contractable by cooling to cause the relative movement between the first plate and the second plate; or
        the first plate is coupled to at least one elastic member and the first plate is moved responsive to vibration applied to the first plate.

2. The piezoelectric nanodevice of claim 1, wherein the first substrate slides up and down along the second substrate in a longitudinal direction of the second substrate to generate the friction.

3. The piezoelectric nanodevice of claim 1, wherein one of the first plate and the second plate is a movable plate and the other of the first plate and the second plate is a fixed plate.

4. The piezoelectric nanodevice of claim 1, further comprising:
    a cooler coupled to the at least one connecting member and configured to cool the at least one connecting member by flowing therein a coolant intermittently.

5. The piezoelectric nanodevice of claim 3, wherein the at least one elastic member is stretched or compressed by sound waves applied to the movable plate.

6. The piezoelectric nanodevice of claim 1, wherein one of the first substrate and the second substrate has at least one protrusion and the other of the first substrate and the second substrate has at least one groove, and further wherein the at least one protrusion is configured to be inserted in the at least one groove to be slid up and down therein.

7. The piezoelectric nanodevice of claim 1, wherein the nanorods of the first substrate are coated with an electro conductive material.

8. The piezoelectric nanodevice of claim 1, wherein the electro conductive material includes Au, Pt, Ag, Cu, or a combination thereof.

9. The piezoelectric nanodevice of claim 1, wherein the piezoelectric nanorods of the second substrate include ZnO, $SnO_2$, CdS, tourmaline, rochell salt, $BaTiO_3$, $NH_4H_2PO_4$, or a combination thereof.

10. A piezoelectric nanodevice comprising:
a first plate having vertically affixed thereon a multiple number of first substrates each having nanorods, the first plate having a planar configuration; and
a second plate having a planar configuration and having vertically affixed thereon a multiple number of second substrates each having piezoelectric nanorods,
wherein one of the first plate and the second plate functions as a movable plate that is moved up and down in a plane with respect to the other plate to generate friction between the nanorods of the first substrates and the piezoelectric nanorods of the second substrates to generate electric voltage,
wherein one of:
the movable plate is coupled to at least one connecting member expandable by heating and contractable by cooling; or
the movable plate is coupled to at least one elastic member and the moveable plate is moved responsive to vibration applied to the movable plate.

11. The piezoelectric nanodevice of claim 10, wherein the at least one elastic member is stretched or compressed by sound waves applied to the movable plate.

12. The piezoelectric nanodevice of claim 10, wherein one of the first substrate and the second substrate has at least one protrusion and the other of the first substrate and the second substrate has at least one groove, and further wherein the at least one protrusion is configured to be inserted in the at least one groove to be slid up and down therein.

13. A piezoelectric nanodevice comprising:
a first plate having vertically affixed thereon a multiple number of first substrates each having nanorods;
a second plate having vertically affixed thereon a multiple number of second substrates each having piezoelectric nanorods; and
at least one connecting member whose one end is coupled with one of the first plate and the second plate,
wherein the at least one connecting member is lengthened or shortened to generate friction between the nanorods of the first substrates and the piezoelectric nanorods of the second substrates.

14. The piezoelectric nanodevice of claim 13, wherein the at least one connecting member includes a material having a high thermal expansion coefficient.

15. The piezoelectric nanodevice of claim 14, further comprising:
a heat conducting plate affixed to the other end of the at least one connecting member.

16. The piezoelectric nanodevice of claim 13, wherein the at least one connecting member has elasticity to be stretched or compressed by vibration applied to at least one of the first plate and the second plate.

17. The piezoelectric nanodevice of claim 13, wherein one of the first substrate and the second substrate has at least one protrusion and the other of the first substrate and the second substrate has at least one groove, and further wherein the at least one protrusion is configured to be inserted in the at least one groove to be slid up and down therein.

18. A piezoelectric nanodevice comprising:
a first substrate having formed thereon a plurality of nanorods; and
a second substrate having formed thereon a plurality of piezoelectric nanorods;
a first plate coupled with the first substrate;
a second plate coupled with the second substrate; and
at least one coupling member coupled with one of the first plate and the second plate, wherein the at least one coupling member is expandable and contractable and wherein the plurality of nanorods and the plurality of piezoelectric nanorods are positioned to generate electric voltage during expansion and contraction of the at least one coupling member.

19. The piezoelectric nanodevice of claim 18, wherein the nanorods formed on the first substrate are coated with a conductive material and are less easily bent than the piezoelectric nanorods.

20. A piezoelectric nanodevice comprising:
a first substrate having formed thereon a multiple number of nanorods;
a second substrate having formed thereon a multiple number of piezoelectric nanorods;
a first plate associated with the first substrate; and
a second plate associated with the second substrate,
wherein the first plate is moveable relative to the second plate such that the first substrate associates with the second substrate to generate friction between the nanorods of the first substrate and the piezoelectric nanorods of the second substrate to generate electric voltage,
wherein one of:
the first plate is coupled to at least one connecting member and the at least one connecting member is expandable by heating and contractable by cooling to cause the relative movement between the first plate and the second plate; or
the first plate is coupled to at least one elastic member and the first plate is moved responsive to vibration applied to the first plate.

21. A piezoelectric nanodevice comprising:
a first substrate having formed thereon a plurality of nanorods; and
a second substrate having formed thereon a plurality of piezoelectric nanorods;
a first plate coupled with the first substrate;
a second plate coupled with the second substrate; and
at least one coupling member coupling the first plate and the second plate,
wherein the at least one coupling member is effective to cause relative movement between the first plate and the second plate, and
wherein the plurality of nanorods and the plurality of piezoelectric nanorods are positioned to generate electric voltage during the relative movement effected by the at least one coupling member.

22. The piezoelectric nanodevice of claim 21, wherein the at least one coupling member includes at least one connecting member expandable by heating and contractable by cooling to cause the relative movement.

23. The piezoelectric nanodevice of claim 21, wherein the at least one coupling member includes at least one expanding member expandable responsive to vibration to cause the relative movement.

* * * * *

UNITED STATES PATENT AND TRADEMARK OFFICE
CERTIFICATE OF CORRECTION

PATENT NO. : 8,415,859 B2  
APPLICATION NO. : 12/606824  
DATED : April 9, 2013  
INVENTOR(S) : Lee Page 1 of 1

It is certified that error appears in the above-identified patent and that said Letters Patent is hereby corrected as shown below:

In the Specifications:

In Column 2, Line 52, delete "substrate 100" and insert -- substrate 110 --, therefor.

In Column 2, Line 60, delete "rochell salt," and insert -- Rochelle salt, --, therefor.

In the Claims:

In Column 13, Line 16, in Claim 9, delete "rochell salt," and insert -- Rochelle salt, --, therefor.

Signed and Sealed this  
Sixteenth Day of July, 2013

Teresa Stanek Rea  
*Acting Director of the United States Patent and Trademark Office*